United States Patent
Umehara et al.

(10) Patent No.: US 7,485,615 B2
(45) Date of Patent: Feb. 3, 2009

(54) PROCESS FOR PRODUCING GRANULAR ANIONIC SURFACTANT

(75) Inventors: Masahiro Umehara, Wakayama (JP);
Hiroyuki Yamashita, Wakayama (JP);
Yasumitsu Sakuma, Wakayama (JP);
Kazuhito Miyoshi, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/911,717

(22) Filed: Aug. 5, 2004

(65) Prior Publication Data

US 2005/0043202 A1 Feb. 24, 2005

(30) Foreign Application Priority Data

Aug. 6, 2003 (JP) .............................. 2003-287491

(51) Int. Cl.
*C11D 17/00* (2006.01)
(52) U.S. Cl. ...................... 510/444; 510/457; 510/424
(58) Field of Classification Search ................. 510/444, 510/445, 446, 457; 159/6.3, 47.1
See application file for complete search history.

(56) References Cited

U.S. PATENT DOCUMENTS 5,646,107 A 7/1997 Emery et al.

6,191,097 B1 2/2001 Lueder et al.

FOREIGN PATENT DOCUMENTS

| EP | 0739977 A1 | 10/1996 |
| EP | 0816486 A1 | 1/1998 |
| JP | 53-39037 | 4/1978 |
| JP | 54-106428 A | 8/1979 |
| JP | 55-69698 A | 5/1980 |
| JP | 57-209633 | * 12/1982 |
| JP | 2-222498 A | 9/1990 |
| JP | 5-331496 A | 12/1993 |
| JP | 2002-508783 A | 3/2002 |
| WO | WO95/01959 A1 | 1/1995 |
| WO | WO98/38278 A1 | 9/1998 |

OTHER PUBLICATIONS

English language abstract of JP 2003 027093 A (Jan. 29, 2003).
English language abstract of JP 03257046 (Nov. 15, 1991).

* cited by examiner

*Primary Examiner*—Necholus Ogden, Jr.
(74) *Attorney, Agent, or Firm*—Birch, Stewart, Kolasch & Birch, LLP

(57) ABSTRACT

The invention provides a process for producing a granular anionic surfactant, including the steps of carrying out drying and granulation simultaneously while adding an anionic surfactant paste to a powder raw material under reduced pressure in a granulator provided with a stirring blade and a cracking blade to obtain granules.

3 Claims, No Drawings

PROCESS FOR PRODUCING GRANULAR ANIONIC SURFACTANT

This Nonprovisional application claims priority under 35 U.S.C. § 119(a) on Patent Application No. 2003-287491 filed in Japan on Aug. 6, 2003, the entire contents of which are hereby incorporated by reference.

FIELD OF THE INVENTION

The present invention relates to a process for producing a granular anionic surfactant, which may be used for example, for a clothing detergent, a kitchen cleaning detergent, a dentifrice foaming agent, a shampoo powder, a polymerization emulsifier, cement foaming agent and the like and to a detergent composition and a cement additive containing the granular anionic surfactant.

BACKGROUND OF THE INVENTION

In the production of a granular anionic surfactant, conventionally, a liquid or paste anionic surfactant is used as the starting material and water is removed to carry out drying and granulation, thereby producing the surfactant. Examples of a conventional process for producing a granular anionic surfactant include methods using spray drying such as a method in which a low-concentration slurry having a water content of 60 to 70% by weight is spray-dried taking its viscosity into account (JP-A 55-69698, JP-A 53-39037) and a method in which a high-concentration slurry having a solid concentration of 60 to 80% by weight is spray-dried utilizing the minimum value of the viscosity of a slurry of an alkyl sulfate (JP-A 54-106428).

JP-A 2-222498 discloses a method in which a high-concentration detergent paste raw material having a water content of 20 to 35% by weight is dried using a vacuum thin film drier.

JP-A 5-331496 discloses a method in which a high-density detergent paste raw material is supplied to the inside of a cylindrical casing under vacuum, and a thin film of the high-density detergent paste raw material is formed on the inside wall surface by the tip of a rotatable plate blade and dried rapidly, followed by scraping the dried powder by the plate blade to obtain a flake-like dried product.

In U.S. Pat. No. 5,646,107 and JP-A 2002-508783, a method is exemplified in which a paste is dried and granulated simultaneously by using a flash method or a flash drier.

Also, WO-A 95/01959 discloses a method of producing granules of an alkylsulfuric acid.

SUMMARY OF THE INVENTION

The present invention relates to a process for producing a granular anionic surfactant, including drying and granulating simultaneously, while adding an anionic surfactant paste to a powder raw material under reduced pressure, in a granulator provided with a stirring blade and a cracking blade to obtain granules.

The present invention also relates to a granular anionic surfactant obtained by this production process. The present invention also relates to a detergent composition and a cement additive containing this granular anionic surfactant.

DETAILED DESCRIPTION OF THE INVENTION

The production process disclosed in JP-A 55-69698 and JP-A 53-39037 have the drawback that these methods need a large scale drier and high drying energy because they involve a spray-drying process. Also, with regards to the method of JP-A 54-106428, a large scale drier is required though high energy is not required since a high-concentration slurry is used.

The method of JP-A 2-222498 is a method of drying a high-density detergent paste raw material continuously. As to a method of granulating an anionic surfactant itself, a technologically satisfactory solution is not obtained.

In the thin film drier of JP-A 5-331496, the process is carried out at high temperatures because of a low vacuum and there is therefore a fear as to decomposition of the raw material. Also, because only a flake-like dried product is obtained, it is necessary to after-treat the flake by, for example, an extrusion granulation method.

It is noted in U.S. Pat. No. 5,646,107 and JP-A 2002-508783 that the pressure in the granulator is high and drying temperature is high. The reference method has the drawback that it cannot be applied to anionic surfactants which easily deteriorate by heat and, as to the granulated product, it is powdered, the grain distribution is broadened, a load on the stirring shaft is increased and a desired particle diameter is not obtained so that it is necessary to make the granulated product have a desired particle diameter by using, for example, an extruder in a subsequent step.

Though an anionic surfactant powder is obtained in WO-A 95/01959, particles having a good outward appearance are obtained only by means of an extrusion granulation method in the subsequent step.

As mentioned above, the prior arts have such drawbacks that the scale of a drier is large, the drying load is large and thermal deterioration is large. No granule having a satisfactory appearance can be obtained. It is necessary there to process a dried powder again for granulation.

Therefore, it is desired to develop a production process which allows the use of a small scale dryer, has a decreased drying load, has decreased thermal deterioration, and can produce granules having a good hue and a good outward shape and a particle diameter falling in an optimum range.

Also, the optimization of the particle diameter of a granular anionic surfactant makes it possible to improve not only the handling characteristics of the particle itself but also the product yield, and also, with regard to product qualities (e.g., solubility); the granule of the present invention is more improved in product value than conventional dried granules. It is therefore desired to improve in this point further.

The present invention relates to a process for producing a granular anionic surfactant, the method allowing the scale of a drier to be small, allowing a decrease in drying load, allowing drying at low temperatures, producing good granules which have decreased thermal deterioration properties, having a good hue, being superior in outward appearance and solubility, having decreased water content, being almost free from caking and having a particle diameter falling in an optimum range. Also in this production process, the particle diameter of a granular anionic surfactant is optimized, thereby improving the handling characteristics of particles themselves to thereby produce a granular anionic surfactant having high solubility.

The production process of the present invention does not need premixing or complicated processes and enables the production of a granular anionic surfactant which contains an anionic surfactant in a high content. Such surfactant is provided with basic performances and has good particle properties.

Anionic Surfactant Paste

Examples of the anionic surfactant used in the present invention include, though not particularly limited to, alkyl sulfates, polyoxyalkylene alkyl ether sulfates, α-olefin sulfate, alkylbenzene sulfonates and α-sulfo fatty acid ester salts. Among these compounds, alkyl sulfates and polyoxyalkylene alkyl ether sulfates are preferable. Examples of the salt include alkali metal salts, alkali earth metal salts, ammonium salts and alkanolamine salts. Among these salts, alkali metal salts are preferable and sodium salts, potassium salts and mixtures of these salts are also preferable.

Alkyl sulfates and polyoxyalkylene alkyl ether sulfates are both obtained by sulfating a higher alcohol or an adduct obtained by adding an alkylene oxide such as ethylene oxide and propylene oxide to a higher alcohol, followed by neutralizing. In the sulfating reaction, unreacted products may be present in an amount range from 10% by weight or less and preferably 5% by weight or less.

Examples of the alkyl sulfate include alkyl sulfates represented by formula (I).

$$(R^3O\text{—}SO_3)_pM^1 \qquad (I)$$

In the formula, $R^1$ represents a straight-chain or branched alkyl or alkenyl group having 8 to 24 and preferably 8 to 18 carbon atoms, $M^1$ represents a cation such as an alkali metal atom, an alkali earth metal atom or an alkanol-substituted or unsubstituted ammonium group and p represents the valence of $M^1$ and denotes a number of 1 or 2.

Also, examples of the polyoxyalkylene alkyl ether sulfate include polyoxyalkylene alkyl ether sulfates represented by formula (II).

$$(R^2O\text{-}(AO)_mSO_3)_qM^2 \qquad (II)$$

In the formula, $R^2$ represents a straight-chain or branched alkyl or alkenyl group having 8 to 24 carbon atoms, A represents an alkylene group having 2 to 4 carbon atoms, m AOs may be same or different. m represents the number of addition mols of an alkylene oxide and denotes a number from 0.05 to 20. $M^2$ represents an alkali metal atom, an alkali earth metal atom or an alkanol-substituted or unsubstituted cation such as an ammonium group and q represents the valence of $M^2$ and denotes 1 or 2.

The average addition mol number m of an alkylene oxide added to the polyoxyalkylene alkyl ether sulfate represented by formula (II) is preferably 0.05 to 2.0, more preferably 0.1 to 1.0 and even more preferably 0.2 to 0.8 from the viewpoint of obtaining excellent granular qualities and suppressing the caking characteristics of granules. Also, $R^2$ is an alkyl or alkenyl group having preferably 8 to 20, more preferably 8 to 18 and even more preferably 10 to 18 carbon atoms from the viewpoint of caking characteristics when the sulfate is powdered and from the viewpoint of the solubility of particles and more preferably an alkyl group. AO is preferably an oxyalkylene group having 2 to 3 and particularly 2 carbon atoms. $M^2$ is preferably an alkali metal atom such as Na and K, an alkali earth metal atom such as Ca and Mg or an alkanol substituted or unsubstituted ammonium group, more preferably an alkali metal atom and even more preferably Na. q is preferably 1 or 2 and more preferably 1.

Among the polyoxyalkylene alkyl ether sulfates represented by formula (II), particularly preferable examples include compounds represented by formula (III).

$$(R^3O\text{-}(AO)_nSO_3)_qM^2 \qquad (III)$$

In the formula, $R^3$ represents a straight-chain alkyl group having 8 to 20 and preferably 10 to 18 carbon atoms, n represents the average addition mol number of an alkylene oxide and denotes a number from 0.05 to 2. A, q and $M^2$ respectively have the same meaning as above.

There is no particular limitation to the distribution of alkylene oxides to be added to the polyoxyalkylene alkyl ether sulfates represented by formula (II) and addition distribution obtained by a known method such as a broad or narrow distribution may be adopted.

The anionic surfactant of the present invention is preferably a mixture containing a polyoxyalkylene alkyl ether sulfate and an alkyl sulfate to which no alkylene oxide is added in a fixed ratio from the viewpoint of satisfying both the detergency and the caking characteristics. The content of the alkyl sulfate is preferably 30 to 95% by weight and more preferably 50 to 90% by weight in the anionic surfactant.

The anionic surfactant paste used in the present invention may be prepared using, for example, the methods (1) to (3) shown below.

(1) A method in which an alkylene oxide adduct of a higher alcohol which is obtained by adding an alkylene oxide to an alcohol (hereinafter referred to as "higher alcohol") having 8 to 24 and preferably 8 to 20 carbon atoms such that the average addition mol number of the alkylene oxide is 0.05 to 20 and preferably 0.05 to 2, is sulfated and neutralized.

(2) A method in which a higher alcohol is mixed with an alkylene oxide adduct of a higher alcohol such that the average addition mol number of an alkylene oxide in the mixture is 0.05 to 20 and preferably 0.05 to 2, followed by sulfating and neutralizing.

(3) A method in which a higher alcohol and an alkylene oxide adduct of a higher alcohol are sulfated separately in advance, followed by neutralizing and the resulting products are mixed such that the average addition mol number of an alkylene oxide in the mixture is 0.05 to 20 and preferably 0.05 to 2.

The sulfation and neutralization may be carried out using known methods. As the sulfating agent used for sulfation, sulfur trioxide or chlorosulfonic acid is preferable. When using sulfur trioxide gas, it is generally diluted with inert gas and preferably dry air or nitrogen to use it as a gas mixture in which the concentration of sulfur trioxide is 1 to 8% by volume and preferably 1.5 to 5% by volume. Examples of the neutralizing agent include sodium hydroxide, potassium hydroxide and sodium carbonate and the like.

It is to be noted that an allowable content of unreacted material contained in the anionic surfactant paste of the present invention is 5% by weight or less though the presence of these unreacted materials are undesirable because it causes a reduction in purity and a deterioration in the caking characteristics of the granule and the amount of the unreacted materials is more preferably 2% by weight or less. Here, the unreacted materials include alcohols and alkoxylates which have not been sulfated and minute hydrocarbons and waxes which are by-products in the reaction.

The effective component content of the anionic surfactant paste of the present invention is preferably 60 to 80% by weight from the viewpoint of fluidity and with the view of decreasing the energy load during drying.

The anionic surfactant paste of the present invention may contain a water-soluble inorganic salt. Typical examples of the water-soluble inorganic salt include sodium chloride, mirabilite and sodium carbonate. Such a water-soluble inorganic salt may be added. Alternatively one by-produced by the reaction may be used. For example, in the case of adding NaClO (sodium hypochlorite) to the anionic surfactant paste with the intention of improving the hue, NaCl (sodium chloride) is by-produced. Sodium hypochlorite may be added in this manner to by-produce sodium chloride as an inorganic salt although there is a limitation to the range of applications.

Powder Raw Material

The powder raw material used in the present invention is preferably one containing at least one or more types selected from the group consisting of a surfactant, a water-soluble inorganic salt and a water-insoluble inorganic salt. It is more preferable to use a part of the granule obtained in the production process of the present invention as the powder raw material. Moreover, the granule may be milled.

Examples of the surfactant include anionic surfactants as those described above. Examples of the water-soluble inorganic salt include sodium chloride, mirabilite and sodium carbonate and the like. Examples of the water-insoluble salt include alkali agents such as silicates and carbonates, citrates and divalent metal ion trapping agents such as zeolite.

The particle diameter of the powder raw material is preferably 500 μm or less, more preferably 300 μm or less, even more preferably 200 μm or less, from the viewpoint of regulating drying speed, the grain size of the final granule and handling characteristics.

Examples of the milling machine used preferably in the present invention include Atomizer (manufactured by Fuji Powdal Co., LTD), Fitz Mill (manufactured by Dalton Co., LTD), Pulverizer (manufactured by Dalton Co., LTD), Power Mill (manufactured by Powrec Co., LTD and Co-mill (manufactured by Quadro).

Process for Producing a Granular Anionic Surfactant

The process for producing a granular anionic surfactant according to the present invention is a method in which drying and granulation are carried out simultaneously while adding an anionic surfactant paste to a powder raw material under reduced pressure in a granulator provided with a stirring blade and a cracking blade.

In the present invention, the drying and the granulation are carried out simultaneously under control such that the temperature of the granule is preferably in the range from 35 to 75° C., more preferably from 40 to 75° C., even more preferably from 45 to 70° C., and a variation in temperature during drying is within preferably ±5° C., more preferably ±2° C. and even more preferably ±1° C. Examples of a method of controlling the variation in temperature and the particle diameter of the granular surfactant in this manner include methods of appropriately controlling, for example, (1) the amount and rate of the anionic surfactant paste to be added, (2) pressure in the granulator, (3) jacket temperature in the granulator, (4) introduction of air and inert gas into the granulator and (5) the Froude number of the blade in the granulator. Each of these methods will be explained in detail below.

(1) Added Amount and Adding Rate of the Anionic Surfactant Paste

The amount and rate of the anionic surfactant paste to be added is preferably controlled such that the temperature of the granule falls in the above range. As to the amount of the anionic surfactant paste to be added, the paste is added in such a proportion that the ratio by weight of the anionic surfactant paste to the powder raw material is preferably 1/10 to 10/1, more preferably 4/4 to 7/1. As to the adding rate, if the time taken from the start of the dripping of the paste until the temperature of the system reaches the operation temperature is long. If the dripping rate is too high, on the other hand, granules may be coarse and therefore it is difficult to carry out a stable operation. Therefore, the ratio of the time required to reach the operation temperature to the time required to add the paste is preferably 1/50 to 1/3.

(2) Pressure in the Granulator

The pressure in the granulator is preferably 0.67 kPa to 40 kPa from the viewpoint of dropping the temperature of operated products to suppress the decomposition of the paste and granule. It is more preferably 2.7 kPa to 40 kPa, even more preferably 4.0 to 8.0 kPa from the viewpoint of the load on a vacuum pump and airtightness of the granulator.

(3) Jacket Temperature in the Granulator

Examples of the heat source of the granulator include a hot-water jacket and an electric tracing. The heat source is preferably a hot-water jacket. The temperature of the jacket is preferably 115° C or less, more preferably 100° C. or less. It is even more preferably 90° C. or less from the viewpoint of applying to raw material sensitive to heat.

(4) Introduction of Air and/or Inert Gas into the Granulator

In the present invention, air and/or inert gas may be introduced into the granulator while the anionic surfactant paste is added to carry out drying more efficiently. The amount of air and/or inert gas is preferably 2 to 30 L/min and more preferably 3 to 10 L/min.

(5) Froude Number of the Blade of the Granulator

In the present invention, the Froude number defined by the following equation is preferably 1 to 5 and more preferably 1.5 to 4 from the viewpoint of promoting pressure tightness and forming a sufficient added layer to thereby narrow the distribution of particle sizes.

$$Fr = V/[(R \times g)^{0.5}]$$

In the formula, Fr represents a Froude number, V represents the peripheral speed [m/sec.] of the top of the stirring blade, R represents a radius [m] of gyration of the stirring blade and g represents gravitational acceleration [m/sec.$^2$].

The granulator used in the present invention is preferably one which is equipped with a stirring blade and a cracking blade and forms a clearance between the stirring blade and the wall surface when the stirring blade is rotated. The average clearance is preferably 1 to 30 mm and more, preferably 3 to 10 mm. When the average clearance is 1 mm or more, the pressure tightness of the stuck layer is moderate and therefore the granulator is not driven by excess power. When the average clearance is 30 mm or less, the pressure tightening efficiency is improved, the grain size distribution is not broadened and good productivity is obtained. Examples of the granulator in the present invention include Henschel Mixer (manufactured by Mitsui Miike Kakoki Co., LTD), High-speed Mixer (manufactured by Fukae Poutech Co., LTD), Vertical Granulator (manufactured by Powrec Co., LTD), Loedige Mixer (manufactured by Matsusaka Giken Co., LTD) and Proshear Mixer (manufactured by Taiheiyo Kiko Co., LTD) as batch types and the like. Loedige Mixer (manufactured by Matsusaka Giken Co., LTD), High-speed Mixer (manufactured by Fukae Poutech Co., LTD) and Proshear Mixer (manufactured by Taiheiyo Kiko Co., LTD) are particularly preferable. Examples of the granulator as continuous types include Continuous Loedige Mixer (middle speed mixer: relatively long retention time), and CB Recycler (manufactured by Loedige), Turbulizer (manufactured by Hosokawamicron Corporation), Shugi Mixer (manufactured by Powrec Co., LTD) and Flow Jet Mixer (manufactured by Funken Co., LTD) and the like. A granulator designed for vacuum-drying is also preferable.

The granulator used in the present invention is preferably equipped with a jacket that controls internal temperature (product temperature) and a nozzle for a gas blowing operation. Specific examples of a more preferable granulator include those described in JP-A 10-296064, JP-A 10-296065 or JP-B 3165700.

In the present invention, the use of the granulator equipped with a stirring blade and a cracking blade prevents, for example, overpower (overload) of the granulator and a reduction in granulating characteristics (generation of coarse particles) even if the anionic surfactant paste is granulated and stuck to the wall of the granulator and therefore makes it possible to produce high-density granules. This phenomenon is considered to be as follows. A portion of the anionic surfactant paste, added in the granulator, having an increased pressure density, caused by contacting with the stirring blade, exists on the side of the stirring blade. Another portion having a more decreased pressure density exists closer to the wall surface of the granulator. For this, the anionic surfactant paste can be incorporated into the stuck layer by stirring effect. The granulator will not be overloaded. The anionic surfactant paste incorporated into both the stuck layer and the stirring blade is pressure-densified and also proceeds with a globing process carried out by a rolling action, and the globular granules are released from the stuck layer. This released product further proceeds with a globing process carried out by a rolling action at the granulating part or mixing part in the granulator. Specifically, it is considered that pressure-densifying/rolling granulation can be carried out satisfactorily by the pressure-densifying effect at the stuck layer part and by the rolling action at the granulating part or the mixing part. In order to carry out pressure-densifying/rolling granulation like this, it is important to form a clearance between the wall of the granulator and the stirring blade.

In the present invention, it is preferable to carry out granulation with blowing gas in order to carry out granulation and drying simultaneously. This is because water is vaporized by the blown gas and the resulting granules are cooled using the gas to thereby restrain the granules from being made into a large block. Examples of the gas include nitrogen gas and air and the like.

Also, in the present invention, there is the case where a fine powder is left after the addition of the anionic surfactant paste is finished and it is therefore preferable to provide a step of rotating only the stirring blade without substantially rotating the cracking blade from the viewpoint of taking in the fine powder.

Also, in the granular anionic surfactant obtained by the production process of the present invention, an inorganic powder such as a crystalline aluminosilicate such as an A-type, P-type, X-type or Y-type zeolite or mirabilite or an alkyl sulfate powder may be added according to the need to coat the surface of the particle with these powders, thereby improving the non-caking characteristics of the granules.

The granular anionic surfactant obtained by the production process of the present invention may be colored by a colorant such as a known pigment or dye to improve the appearance of the granule itself. Although no particular limitation is imposed on the coloring method, for example, a method, as described in the publication of JP-A No. 2-258872 in which an aqueous solution containing a dye or pigment is sprayed on the surface of the granular anionic surfactant to color, or a method as described in the publication of JP-A No. 11-158493 in which a dye or pigment is compounded in a proper amount in a paste to color the granular anionic surfactant, may be used. Although no particular limitation is imposed on the colorant to be used, colorants having high solubility or dispersibility are preferable. For example, iron oxide red, ultramarine blue, Lionol Green, Red No. 226, Red No. 405 and Blue No. 1 are preferable.

Granular Anionic Surfactant

The granules obtained in the present invention contains an anionic surfactant preferably in an amount of 80 to 99.5% by weight, more preferably 90 to 99.0% by weight, from the viewpoint of exhibiting the function of the anionic surfactant itself effectively.

The granular anionic surfactant of the present invention may further contain a water-soluble inorganic salt. Examples of the water-soluble inorganic salt include sodium chloride, mirabilite and sodium carbonate and the like. The content of the water-soluble inorganic salt in the granular anionic surfactant of the present invention is preferably 10 parts by weight or less, more preferably 5 parts by weight or less, even more preferably 2 parts by weight or less, based on 100 parts by weight of the anionic surfactant from the viewpoint of keeping the solid content of the anionic surfactant at a high level, though no particular limitation is imposed on it.

The granular anionic surfactant of the present invention may contain other additives as necessary. Examples of these other additives include alkali agents such as silicates and carbonates, divalent metal ion trapping agents such as zeolite, resoiling preventives such as a polyvinylpyrrolidone and carboxymethyl cellulose and others including caking preventives and antioxidants and the like. These other additives may be used to the extent that the object of the present invention is not inhibited.

The granular anionic surfactant of the present invention may contain water and unreacted alcohols. A preferable composition of the granular anionic surfactant of the present invention is as follows: an alkyl sulfate: 60 to 80% by weight, a polyoxyalkylene alkyl ether sulfate: 18 to 38% by weight, water: 0.5 to 2.5% by weight, an alcohol: 0.5 to 2.0% by weight and an inorganic salt: 1.0 to 2.0% by weight.

The qualities of the granular anionic surfactant of the present invention are preferably as follows.

(a) The average particle diameter is preferably 500 to 2000 μm and more preferably 1000 to 1500 μm. It is to be noted that the average particle diameter in the present invention is measured from the weight percentage based on the size of a screen after the surfactant is oscillated using a standard screen according to JIS Z 8801 for 5 minutes.

(b) The bulk density is preferably 300 to 1000 kg/m$^3$ and more preferably 600 to 800 kg/m$^3$. The bulk density in the present invention is a value found by the method defined in JIS K 3362.

(c) The water content of the granules is preferably 0.3 to 2.5% by weight, more preferably 0.3 to 2.0% from the viewpoint of caking characteristics and even more preferably 1.0 to 2.0% by weight from the viewpoint of decreasing the amount of dust. The water content of the granule is measured by a heating loss method, distillation method, Curl Fisher method (JIS K 0068) or the like though there is no particular limitation to the method. In the examples of the invention, Curl Fisher method (JIS K 0068) is used.

(d) The pH of an aqueous 1 wt % solution is preferably 7.5 to 11.5 and more preferably 8.0 to 10.0. The pH value in the present invention may be found as follows: the granules are dissolved in water (25° C.) so that the concentration of the granule may be 1% by weight of an aqueous solution and the pH of the aqueous solution is measured.

(e) The fluidity is preferably 10 seconds or less and more preferably 8 seconds or less. The fluidity of the granules in the present invention is the time required for 100 mL of the granules to flow out from a bulk density measuring hopper defined in JIS K 3362.

(f) The screen passing rate in the caking test is preferably 85% or more, more preferably 90% or more and even more preferably 95% or more. In a method of measuring the caking characteristics in the present invention, 70 g of the granular anionic surfactant is sealed in a 0.04 mm×70 mm×100 mm vinyl bag with a chuck and a load of 1000 kg/m$^2$ is evenly applied to the vinyl bag, which is then stored at a storing temperature of 50° C. for 30 days. Then, the resulting surfactant is placed statically on a 2000 μm screen, which is beaten 10 times to evaluate the caking characteristics of the granules based on the ratio of the granules passing through the 2000 μm screen.

(g) The sphericity is preferably 0.85 or more, more preferably 0.90 or more and even more preferably 0.95 or more. The sphericity in the present invention is preferably measured by image analysis. Specific examples of the measuring method, though not particularly limited to, is described in JP-A No. 2003-130785. In this method, extruded particles are distributed on a flat surface so that they may be not overlapping one another and a photo-picture thereof is taken. Based on the image data of each particle, which data is extracted by image processing from the resulting image data, the sphericity and the like are measured. The sphericity of the particles of the present invention is measured using this method. 4000 or more particles are measured from the viewpoint of reliability of measured values.

(h) The hue is preferably 1 to 20 and more preferably 1 to 15 in terms of Klett value. The Klett value is measured as follows: the granular anionic surfactant is dissolved in a concentration of 10% by weight and the solution is measured using an absorptiometer by using a 10 mm cell and a wavelength of 420 nm.

Among these granular anionic surfactants, those satisfying all the following requirements (a) to (d) are particularly preferable.

(a) Average particle diameter: 500 to 2000 μm (b) Bulk density: 300 to 1000 kg/m$^3$ (c) Water content: 0.3 to 2.5% by weight (d) pH value of an aqueous 1 wt % solution: 7.5 to 11.5

Examples of the milling machine used to produce the powder raw material include, though not limited to, an atomizer, co-mill, pin mill, pulverizer, Fitz Mill and Nebula Sizer and the like. It is preferable to use milling machines capable of milling the raw material as finely and evenly as possible.

Detergent Composition

The granular anionic surfactant of the present invention is added to and mixed with other detergent raw materials to constitute a detergent composition, which is then made into a preparation according to the need, whereby a detergent which has high resistance to hard water so that it foams well in hard water and is superior in solubility at low temperatures may be obtained. Therefore, the granular anionic surfactant is very useful as a detergent base material.

In the present invention, as the surfactant among the detergent raw materials, besides the granular anionic surfactant of the present invention, a nonionic surfactant and further, according to the need, a cationic surfactant and amphoteric surfactant may be used.

The content of the granular anionic surfactant in the detergent composition of the present invention is preferably 1 to 50% by weight and more preferably 5 to 30% by weight from the viewpoint of detergency. The counter anion of the anionic surfactant is preferably an alkali metal ion from the viewpoint of improving detergency.

Examples of the nonionic surfactant include a polyoxyalkylene alkyl ether, polyoxyalkylene alkylphenyl ether, polyoxyalkylene fatty acid ester, polyoxyethylenepolyoxypropylene alkyl ether, polyoxyalkylenealkylamine, glycerin fatty acid ester, higher fatty acid alkanolamide, alkylglycoside, alkyl glucose amide and alkylamine oxide. Polyoxyalkylene alkyl ethers in which the average addition mol number of an alkylene oxide is 5 to 30 and preferably 6 to 15 are preferable, the polyoxyalkylene alkyl ethers being ethylene oxide adducts or ethylene oxide-propylene oxide mixture adducts of an alcohol having 10 to 18 and preferably 12 to 14 carbon atoms from the viewpoint of detergency. Polyoxyethylenepolyoxypropylene alkyl ethers are preferable from the viewpoint of detergency and solubility. This compound may be obtained by reacting ethylene oxide adducts having 10 to 18 and preferably 12 to 14 carbon atoms with propylene oxide and further with ethylene oxide. The content of the nonionic surfactant in the detergent composition of the present invention is preferably 1 to 50% by weight and more preferably 5 to 30% by weight from the viewpoint of detergency.

Examples of the cationic surfactant include alkyltrimethylammonium salts and examples of the amphoteric surfactant include carbobetaine type or sulfobetaine type surfactants and the like.

The total content of surfactants in the detergent composition of the present invention is preferably 10 to 60% by weight, more preferably 20 to 50% by weight and even more preferably 27 to 45% by weight from the viewpoint of obtaining desired powder characteristics.

Also, the detergent composition of the present invention may be compounded of water-soluble inorganic salts such as carbonates, hydrogen carbonates, silicates, sulfates, sulfites or phosphates from the viewpoint of improving the ion strength of a washing solution. Here, the amount of the carbonate to be compounded in the detergent composition is preferably 25% by weight or less, more preferably 5 to 20% by weight and even more preferably 7 to 15% by weight, based on its anhydride, from the viewpoint of detergency and low-temperature dispersibility under the condition that the sample is allowed to stand for a long time in cooling water. Also, the sum of the carbonates and sulfates is preferably 5 to 35% by weight, more preferably 10 to 35% by weight and even more preferably 12 to 25% by weight, based on their anhydride.

Moreover, the detergent composition of the present invention may be compounded of an alkali metal silicate. As the alkali metal silicate, either a crystalline material or an amorphous material may be used. However, it is preferable to contain a crystalline material because it also has cation exchange ability. The ratio $SiO_2/M^3{}_2O$ (where $M^3$ represents an alkali metal) in the alkali metal silicate is preferably 2.6 or less, more preferably 2.4 or less and even more preferably 2.2 or less from the viewpoint of alkali ability and preferably 0.5 or more, more preferably 1.0 or more, even more preferably 1.5 or more and even more preferably 1.7 or more from the viewpoint of storage stability. Here, examples of the amorphous alkali metal silicate include sodium silicate of JIS No. 1 and No. 2 and Britesil C20, Britesil H$_2$O, Britesil C24, Britesil H24 (all the above names are trademarks, manufactured by The PQ Corporation) which are granulated particles of water glass dry products. Also, NABION15 (trademark, manufactured by RHONE-BOULENC) which is a composite of sodium carbonate and an amorphous alkali metal silicate may be used.

The alkali metal silicate has excellent alkali ability and cation exchange ability equal to that of A4-type zeolite when crystallized and also becomes a very desirable base material also from the viewpoint of low-temperature dispersibility. Here, the detergent composition of the present invention preferably contains one or more crystalline alkali metal silicates selected from compounds represented by the following formula (IV) or (V).

$$x(M^4_2O) \cdot y(SiO_2) \cdot z(M^5_uO_v) \cdot w(H_2O) \qquad (IV)$$

In the formula, $M^4$ represents an Ia group in the periodic chart (preferably K and/or Na), $M^5$ represents one or more types selected from IIa group elements, IIb group elements, IIIa group elements, IVa group elements and VIII group elements (preferably Mg or Ca), y/x=0.5 to 2.6, z/x=0.001 to 1.0, w=0 to 20 and v/u=0.5 to 2.0.

$$M^4_2O \cdot x'(SiO_2) \cdot y'(H_2O) \qquad (V)$$

In the formula, $M^4$ has the same meaning as above, x'=1.5 to 2.6 and y'=0 to 20 (preferably substantially 0)

These crystalline alkali metal silicates are preferably compounded in the detergent composition of the present invention in an amount of 0.5 to 40% by weight, more preferably 1 to 25% by weight, even more preferably 3 to 20% by weight and even more preferably 5 to 15% by weight. Here, the amount of crystalline silicates is preferably 20% by weight or more, more preferably 30% by weight or more and even more preferably 40% by weight or more based on the total amount of the alkali metal silicates. This crystalline alkali metal silicate is available under the name of "Prifeed" (trade name, δ-Na$_2$O.2SiO$_2$) from Tokuyama Siltech. As the metal silicate, a powdery one and/or granular one may be used. Particularly, these metal silicates are preferably used together with sodium carbonate.

Also, the detergent composition of the present invention may be compounded of an organic acid salt such as a citrate, hydroxyiminodisuccinate, methylglycine diacetate, glutamic acid diacetate, asparagine diacetate, serine diacetate, ethylenediamine disuccinate and ethylenediamine tetraacetate from the viewpoint of improving sequestering ability. The detergent composition of the present invention is preferably compounded of a cation exchange-type polymer having a carboxylic acid group and/or a sulfonate group from the viewpoint of improving, for example, sequestering ability and the ability of dispersing solid particle contaminants. As the polymer, a salt of acrylic acid/maleic acid copolymer having a molecular weight of 1,000 to 80,000, polyacrylate and a polyacetal carboxylate such as a polyglyoxylic acid having a molecular weight of 800 to 1,000,000 and preferably 5,000 to 200,000 are preferable. The cation exchange-type polymer and/or the organic acid salt are compounded in the detergent composition in an amount of 0.5 to 12% by weight, more preferably 1 to 10% by weight, even more preferably 1 to 7% by weight and even more preferably 2 to 5% from the viewpoint of detergency.

Also, the detergent composition of the present invention may be compounded of a crystalline aluminosilicate such as an A-type, P-type, X-type, Y-type and faujasite-type zeolite. The average particle diameter of the crystalline aluminosilicate is preferably 0.1 to 10 μm. Also, the detergent composition may be formulated with an amorphous aluminosilicate having an oil-absorbing ability of 80 mL/100 g or more measured according to the JIS K 5101 method for the purpose of preventing bleeding of a liquid component such as a nonionic surfactant. Examples of the amorphous aluminosilicate include those described in each publication of JP-A Nos. 62-191417 and 62-191419. The amorphous aluminosilicate is preferably compounded in an amount of 0.1 to 20% by weight in the detergent composition of the present invention.

The detergent composition of the present invention may be formulated with a dispersant or color-transfer preventive agent such as carboxymethyl cellulose, polyethylene glycol, polyvinyl pyrrolidone and polyvinyl alcohol, bleaching agent such as a percarbonate, bleaching activator, enzyme, biphenyl-type or stilbene-type fluorescent dye, antifoaming agent, antioxidant, bluing dye and perfume. It is to be noted that a separately granulated particle group such as an enzyme, bleaching activator, antifoaming agent, antioxidant and antifoaming agent may be after-blended.

Examples of the bleaching activator used in the present invention include tetraacetylethylenediamine, glucose pentaacetate, tetraacetyl glycol uril and compounds represented by formula (I), (II), (III) or (IV) (e.g., sodium p-phenolsulfonate (sodium acetoxybenzenesulfonate, sodium benzoyloxybenzenesulfonate and linear or branched octanoyl/nonanoyl/decanoyl/dodecanoylphenol sulfonate) or p-hydroxybenzoate (acetoxybenzenecarboxylic acid, octanoyloxybenzenecarboxylic acid, decanoyloxybenzenecarboxylic acid and dodecanoyloxybenzenecarboxylic acid)).

Examples of the enzyme used in the present invention include, though not particularly limited to, hydrolases, oxidoreductases, lyases, transferases and isomerases and the like. Particularly preferable examples include cellulase, protease, lipase, amylase, pullulanase, esterase, hemicellulase, peroxidase, phenoloxidase, protopectinase and pectinase and the like. These enzymes may be used in combinations of two or more. A combination of protease and cellulase is particularly preferable when considering the dispersibility of a colorant during enzymatic granulation and dyeing property to clothes. Although this reason is not clarified, it is estimated that not only the effect of protease on removing stains and keratin on the surface of fabrics but also the effect of cellulase on removing sebum present inside of fabrics are improved, whereby retention of dyes on sebum components can be prevented.

The aforementioned enzyme may be those produced by any method without any particular limitation. Generally, enzymes produced by subjecting a culture containing an enzyme produced by microorganisms to filtration and drying the collected material are used. The enzyme may contain a stabilizer, saccharides, inorganic salts such as sodium sulfate, polyethylene glycol, impurities, water and the like according to culture conditions and separating conditions.

As a method of adding these base materials in the production process, there is a method in which sodium carbonate is compounded in an aqueous slurry, followed by spray drying to make a powder, a method in which one prepared so as to have an average particle diameter of 1 to 40 μm is added in, for example, the granulation step or surface reforming step and a method in which dense ash, light ash or the like is after-blended. Examples of a method of adding the amorphous alkali metal silicate include a method in which it is blended in an aqueous slurry, which is then spray-dried and a method in which a granulated one is after-blended. Examples of a method of adding the crystalline alkali metal silicate include a method in which one prepared so as to have an average particle diameter of about 1 to 40 μm, preferably about 1 to 30 μm, more preferably about 1 to 20 μm and even more preferably about 1 to 10 μm is added in, for example, the granulation step or surface reforming step. At this time, it is preferable to use it by combining base materials such as a crystalline and/or amorphous aluminosilicate from the viewpoint of storing stability and the like. Also, for example, a method of after-blending granules prepared using a roller compactor as described in the publication of JP-A No. 3-16442 is exemplified.

No particular limitation is imposed on the process for producing the detergent composition and the shape of the detergent composition. The granular anionic surfactant of the present invention and other detergent raw materials may be simply dry-blended with each other by using a V-type blender or Naughter Mixer (manufactured by Hosokawamicron Corporation and the like) or granulated.

In the case of granulating, a binder may be compounded according to the need. As the binder, an aqueous solution or paste of the aforementioned various surfactants may be used. Besides the above, a high-molecular compound, such as a cation exchange-type polymer or a polyethylene glycol, having a carboxylic acid group and/or sulfonic acid group having sequestering ability and solid particle contaminant-dispersing ability may be used as an effective binder. There is no particular limitation to a granulation method and (1) a stirring rolling granulation method, (2) a fluidized-bed granulation method, (3) an extrusion granulation method, (4) a compressive granulation method such as tabletting, briquetting and compacting may be used to form desired granules of a detergent composition.

Cement Additives

The granular anionic surfactant of the present invention may be preferably used as a cement additive and, particularly, as an air-entraining agent. The average particle diameter of the granular anionic surfactant used as a cement additive is preferably 500 to 1500 μm, more preferably 500 to 1100 μm, from the viewpoint of solubility and handling characteristics. In this case, the granular anionic surfactant is added together with cement and aggregates, the mixture is mixed with water to thereby obtain concrete or mortar in which fine air cells having a diameter of about 0.25 to 0.025 mm are independently distributed evenly. These concrete and mortar including fine air cells have many advantages in improving durability to freezing and thawing and in improving workability. When the granular anionic surfactant of the present invention is used, concrete and mortar are obtained which are improved in the stability of formed air cells and have a decrease in the number of cracks after application. No particular limitation is imposed on the shape of the surfactant. As the surfactant, a powdery one, a granular one and the like may be used. Also, the granular anionic surfactant is prepared and used as a composition obtained by dry-blending the surfactant with components such as cement, calcium oxide, calcium hydroxide and calcium sulfate which are to be compounded in the cement and powders that do not adversely affect the characteristics of applied concrete or mortar.

EXAMPLES

The following examples further describe and demonstrate embodiments of the present invention. The examples are given solely for the purpose of illustration and are not to be construed as limitations of the present invention.

"%" in the following examples indicates "%" by weight unless otherwise noted.

Synthesis Example 1

Gas containing 2.0% by volume of sulfur trioxide and a higher alcohol (molecular weight: 199) with an alkyl group having 12 to 16 carbon atoms wherein the distribution of these alkyl groups, namely, $C_{12}/C_{14}/C_{16}=67\%/28\%/5\%$ were continuously poured into a thin-film down-flow type reactor having an inside diameter of 16 mmφ and a length of 5 m at 60° C. to react. The flow rate was controlled such that the reaction molar ratio of the sulfur trioxide gas to the higher alcohol was 1.01. The resulting sulfate was neutralized by an aqueous 32.2% sodium hydroxide solution, to which was then added 75% phosphoric acid (buffer agent). Then, the solution was exactly adjusted to pH=10 by adding an aqueous 32.1% sodium hydroxide solution. The effective component of the resulting sodium alkylsulfate paste (hereinafter referred to as "paste 1") was 73%.

Synthesis Example 2

The same reaction as in Synthesis Example 1 was run except that a raw material (average molecular weight: 209) prepared by compounding a higher alcohol with an alkyl group having 12 to 16 carbon atoms wherein the distribution of these alkyl groups, namely, $C_{12}/C_{14}/C_{16}=67\%/28\%/5\%$ and an ethoxylate obtained by adding 1.0 mol of ethylene oxide on the average to the higher alcohol in a ratio of 75%: 25% by using a potassium hydroxide catalyst was used in place of the higher alcohol used in Synthesis Example 1 and an aqueous 30.1% sodium hydroxide solution was used. The effective component of the obtained sodium polyoxyethylenealkylsulfate paste (hereinafter referred to as "paste 2") was 72%.

Synthesis Example 3

A paste prepared by blending the paste 1 with the paste 2 in ratio by weight of 75:25 was added dropwise to a vacuum drier (FMD-1200JE Model, manufactured by Powtech Co., LTD (Fukae)) having an internal capacity of 2500 L at an average addition rate of 150 kg/Hr while controlling the drier under the following drying condition: jacket temperature: 85° C., pressure: 4.0 kPa and operation temperature: 70±1° C. and also under the following granulation condition: rotation of the agitator: 55 r/min, rotation of the chopper: 2000 r/min and average clearance between the stirring blade and the wall surface: 5.5 mm, to thereby carry out drying and granulation simultaneously, thereby obtaining 600 kg of granules. Moreover, a part of the granules were milled by an atomizer (manufactured by Fuji Powdal Co., LTD) to obtain a powder raw material having an average particle diameter of 120 μm.

Example 1

100 kg of a powder of sodium alkylsulfate (EMAL 10P-HD: manufactured by Kao Corporation, average particle diameter: 100 μm) was placed in a vacuum drier (FMD-1200JE Model, manufactured by Powtech Co., LTD) having an internal capacity of 2500 L. The process was started by adding the paste 1 dropwise to the vacuum drier at an average addition rate of 240 kg/Hr under dry-granulating conditions including jacket temperature: 65° C., pressure in the granulator: 5.3 kPa, rotation of the agitator: 70 r/min, rotation of the chopper: 2000 r/min and an average clearance between the stirring blade and the wall surface: 5.5 mm. The dropwise addition of the paste 1 was then controlled so that the production mixture has a temperature of 46±2° C. to carry out drying and granulation simultaneously. When the total amount of the added paste 1 reached 650 kg, the drying granulation was completed to obtain granules of sodium alkyl sulfate (average molecular weight: 301). The ratio of the time required to reach the operation temperature to the time required to add the paste was 1/10.

Example 2

130 kg of a powder of sodium alkylsulfate (EMAL 10P-HD: manufactured by Kao Corporation, average particle diameter: 100 μm) was placed in a vacuum drier (FMD-1200JE Model, manufactured by Powtech Co., LTD) having a capacity of 2500 L. The process was started by adding the paste 1 dropwise to the vacuum drier at an average addition rate of 235 kg/Hr under dry-granulating conditions including jacket temperature: 65° C., pressure in the granulator: 5.3 kPa, rotation of the agitator: 70 r/min, rotation of the chopper: 2000 r/min and an average clearance between the stirring blade and the wall surface: 5.5 mm. The dropwise addition of the paste 1 was then controlled so that the production mixture has a temperature of 45±3° C. to carry out drying and granulation simultaneously. When the total amount of the added paste 1 reached 650 kg, the drying granulation was completed to obtain granules of sodium alkyl sulfate (average molecular weight: 301). The ratio of the time required to reach the operation temperature to the time required to add the paste was 1/9.

Example 3

130 kg of a powder of sodium alkylsulfate (EMAL 10P-HD: manufactured by Kao Corporation, average particle diameter: 100 μm) was placed in a vacuum drier (FMD-1200JE Model, manufactured by Powtech Co., LTD) having a capacity of 2500 L. The process was started by adding the paste 1 dropwise to the vacuum drier at an average addition rate of 304 kg/Hr under dry-granulating conditions including jacket temperature: 85° C., pressure in the granulator: 5.3 kPa, rotation of the agitator: 70 r/min, rotation of the chopper: 2000 r/min and an average clearance between the stirring blade and the wall surface: 5.5 mm. The dropwise addition of the paste 1 was then controlled so that the production mixture may have a temperature of 50±3° C. to carry out drying and granulation simultaneously. When the total amount of the added paste 1 reached 650 kg, the drying granulation was completed to obtain granules of sodium alkyl sulfate (average molecular weight: 301). The ratio of the time required to reach the operation temperature to the time required to add the paste was 1/7.

Example 4

4.3 kg of a powder of sodium alkylsulfate (EMAL 24DH: manufactured by Kao Corporation, average particle diameter: 100 μm) was placed in a vacuum drier (FMD-65JE Model, manufactured by Powtech Co., LTD) having a capacity of 65 L. The process was started by adding the paste 1 dropwise to the vacuum drier at an average addition rate of 19.7 kg/Hr under dry-granulating conditions including jacket temperature: 85° C., pressure in the granulator: 6.7 kPa, rotation of the agitator: 200 r/min, rotation of the chopper: 3000 r/min and an average clearance between the stirring blade and the wall surface: 3.5 mm. The dropwise addition of the paste 1 was then controlled so that the production mixture has a temperature of 60±2° C. to carry out drying and granulation simultaneously. When the total amount of the added paste 1 reached 20 kg, the drying granulation was completed to obtain granules of sodium alkyl sulfate (average molecular weight: 301). The ratio of the time required to reach the operation temperature to the time required to add the paste was 1/20.

Example 5

200 kg of a powder of sodium alkylsulfate (average molecular weight: 311 and average particle diameter: 120 μm), obtained in Synthesis Example 3, was placed in a vacuum drier (FMD-1200JE Model, manufactured by Powtech Co., LTD) having a capacity of 2500 L. The process was started by adding a mixed paste of paste 1 and paste 2 at a mixing ratio of 75:25 dropwise to the vacuum drier at an average addition rate of 150 kg/Hr under dry-granulating conditions including jacket temperature: 85° C., pressure in the granulator: 4.0 kPa, rotation of the agitator: 55 r/min, rotation of the chopper: 2000 r/min and an average clearance between the stirring blade and the wall surface: 5.5 mm. The dropwise addition of the mixed paste was then controlled so that the production mixture has a temperature of 70±1° C. to carry out drying and granulation simultaneously. When the total amount of the added paste reached 450 kg, the drying granulation was completed to obtain a granular anionic surfactant of a polyoxyethylene alkylsulfate (average molecular weight: 311) in which the average addition mol number of ethylene oxide was 0.25. Thereafter, 8% by weight of zeolite was added to the resultant granular anionic surfactant to coat the granular anionic surfactant evenly with zeolite and the resulting granular anionic surfactant was subjected to oscillation screening to obtain a granular anionic surfactant having a size of 500 to 2000 μm. The ratio of the time required to reach the operation temperature to the time required to add the paste was 1/12.

Example 6

4.3 kg of a powder of sodium alkylsulfate (average molecular weight: 311 and average particle diameter: 120 μm), obtained in Synthesis Example 3, was placed in a vacuum drier (FMD-65JE Model, manufactured by Powtech Co., LTD) having a capacity of 65 L. The process was started by adding a mixed paste of paste 1 and paste 2 at a mixing ratio of 75:25 dropwise to the vacuum drier at an average addition rate of 11.4 kg/Hr under dry-granulating conditions including jacket temperature: 85° C., pressure in the granulator: 6.7 kPa, rotation of the agitator: 200 r/min, rotation of the chopper: 3000 r/min and an average clearance between the stirring blade and the wall surface: 3.5 mm. The dropwise addition of the mixed paste was then controlled so that the production mixture has a temperature of 68±2° C. to carry out drying and granulation simultaneously. When the total amount of the added paste reached 20 kg, the drying granulation was completed to obtain_a granular anionic surfactant of a polyoxyethylene alkylsulfate (average molecular weight: 311) in which the average addition mol number of ethylene oxide was 0.25. Thereafter, 8% by weight of zeolite was added to the resultant granular anionic surfactant to coat the granular anionic surfactant evenly with zeolite and the resulting granular anionic surfactant was subjected to oscillation screening to obtain a granular anionic surfactant having a size of 500 to 2000 μm. The ratio of the time required to reach the operation temperature to the time required to add the paste was 1/12.

Comparative Example 1

4.3 kg of a powder of a sodium alkylsulfate (EMAL 24DH: manufactured by Kao Corporation, average particle diameter: 100 μm) was placed in a vacuum drier (FMD-65JE Model, manufactured by Powtech Co., LTD) having a capacity of 65 L.

The process was started by adding the paste 1 dropwise to the vacuum drier at an average addition rate of 19.7 kg/Hr under dry-granulating conditions including jacket temperature: 85° C., at pressure in the granulator: 101.23 kPa, not reducing the pressure in the granulator, rotation of the agitator: 200 r/min, rotation of the chopper: 3000 r/min and an average clearance between the stirring blade and the wall surface: 3.5 mm. The dropwise addition of the paste 1 was then controlled so that the production mixture has a temperature of 60±2° C. to carry out drying and granulation simultaneously. When the total amount of the added paste 1 reached 20 kg, the drying granulation was completed to obtain an anionic surfactant of sodium alkyl sulfate (average molecular weight: 301). However, only block granules were obtained so that a granular anionic surfactant having a desired shape could not be obtained and the content of water was 4.5%. The ratio of the time required to reach the operation temperature to the time required to add the paste was 1/20.

Comparative Example 2

The paste 1 was supplied dropwise from the upper introduction port of a thin film drier (Sebucon: manufactured by Hitachi, Ltd.) at a rate of 13.3 kg/Hr by a high-viscosity paste pump (4NES60 Model: manufactured by Hyoshin Sohbi Co., LTD) to carry out continuous drying under the following conditions: rotation of the blade: 760 r/min, pressure in the drier: 9.2 kPa and drying temperature: 84.4° C. However, only flake-like anionic surfactant was obtained so that a granular anionic surfactant having a desired shape could not be obtained and the content of water was 4.8%.

The production conditions and the properties of the resultant granular anionic surfactants in Examples 1 to 6 and Comparative Examples 1 and 2 are shown collectively in Table 1.

Test Example 1

Each granular anionic surfactant obtained in Examples 1 to 6 and Comparative Examples 1 and 2 was used to measure the caking characteristics according to the following method. The results are shown in Table 2.

Caking Characteristics 70 g of the granular anionic surfactant was sealed in a 0.04 mm×70 mm×100 mm vinyl bag with a chuck and a load of 1000 kg/m² was evenly applied to the vinyl bag, which was then stored at a storing temperature of 50° C. for 30 days. Then, the caking characteristics of the granules were evaluated based on the ratio of the granules passing through the 2000 μm screen according to the following standard.

◎: Almost no occurrence of caking was found after 30 days (passing ratio: 90% or more).

○: Almost no occurrence of caking was found after 14 days (passing ratio: 90% or more).

x: The occurrence of caking was found within 14 days (passing ratio: 90% or more).

TABLE 2

|  |  | Caking characteries |
|---|---|---|
| Example | 1 | ◎ |
|  | 2 | ◎ |
|  | 3 | ◎ |
|  | 4 | ◎ |
|  | 5 | ◎ |
|  | 6 | ○ |
| Comparativ example | 1 | X |
|  | 2 | X |

Test Example 2

The granular anionic surfactant obtained in Example 5 and a commercially available product shown in Table 3 for comparison were used to measure dissolution speed by the following method. The results are shown in Table 3.

Bulk Density

The bulk density was determined by the method described in JIS K 3362.

TABLE 1

|  |  | Example | | | | | | Comparative example | |
|---|---|---|---|---|---|---|---|---|---|
|  |  | 1 | 2 | 3 | 4 | 5 | 6 | 1 | 2 |
| Production condition | Drying temperature (° C.) | 46 ± 2 | 45 ± 3 | 50 ± 3 | 60 ± 2 | 70 ± 1 | 68 ± 2 | 60 ± 2 | 84.4 |
|  | Pressure in the granulator | 5.3 | 5.3 | 5.3 | 6.7 | 4.0 | 6.7 | 101.2 | 9.2 |
|  | Average dropping amount of the paste (kg/Hr) | 240.0 | 235.0 | 304.0 | 19.7 | 150.0 | 11.4 | 19.7 | 13.3 |
| Particle properties | Content of the anionic surfactant (wt %) | 98.2 | 98.2 | 97.5 | 97.1 | 90.5 | 91.7 | 89.2 | 90.1 |
|  | Average particle diameter (μm) | 830 | 900 | 913 | 800 | 1227 | 1056 | Block form | Flake form |
|  | Bulk density (kg/m³) | 710 | 710 | 766 | 706 | 716 | 715 | Non-measurable | Non-measurable |
|  | Water content (%) | 1.8 | 1.6 | 1.8 | 1.4 | 1.0 | 1.4 | 4.5 | 4.8 |
|  | pH value | 9.6 | 9.7 | 9.3 | 9.0 | 9.9 | 10.5 | 9.2 | — |
|  | Fluidity (sec) | 6.1 | 6.1 | 6.1 | 6.2 | 6.6 | 7.1 | Non-measurable | Non-measurable |
|  | Sphericity | 0.94 | 0.94 | 0.95 | 0.92 | 0.96 | 0.95 | Non-measurable | Non-measurable |
|  | Klett value | 5 | 5 | 7 | 8 | 13 | 11 | 7 | 7 |

Dissolution Speed 950 g (30° C.) of ion exchange water was stirred (900 r/min) and 50 g of the granular surfactant was added at a time. The electroconductivity of the solution was measured using a conductometric device (DS-8F, manufactured by HORIBA) with time to define a 99% value (time), when stable electroconductivity was obtained, as the dissolution speed.

TABLE 3

| | Average particle diameter (μm) | Bulk density (kg/m³) | Dissolution speed (sec) |
|---|---|---|---|
| Granular aniopnic surfactant of example | 1227 | 719 | 95 |
| Comparative product: SULFOPON 1216G*[1] | 1060 | 630 | 117 |

*[1]Manufactured by COGNIS

Test Example 3

The resistance to hard water was measured using the granular surfactant obtained in Example 5 and a commercially available product (SULFOPON 1216G, manufactured by COGNIS Co., Ltd.) for comparison according to the following method, and as a result, the granular surfactant obtained in Example 5 and the commercially available product both passed the test concerning the resistance to hard water.

Resistance to Hard Water

This test was made according to the synthetic detergent test method (JIS K 3362). 100 ml of hard water (16° DH) was added to 100 mL of a test solution containing the granular anionic surfactant in an amount of 2.0 g/L as an anhydride at 50° C. with stirring the test solution, which was then allowed to stand in a thermostat for 10 minutes and then taken out. The case where the cross on the critical plate was seen was defined as "Pass" and the case except for that case was defined as "Fail".

Test Example 4

The detergency (foaming power and the stability of foams) was measured using the granular anionic surfactant obtained in Example 6 and a commercially available product shown in Table 4 for comparison according to the following method. The results are shown in Table 4.

Detergency (Foaming Power and the Stability of Foams)

This test was made according to the synthetic detergent test method (JIS K 3362). The sample was dissolved in hard water (16° DH) in a concentration of 2.0 g/L based on an anhydride to prepare a test solution. The height (mm) of a foam generated when 200 ml of this test solution was dropped on a liquid (the same test solution, 50 ml) for 30 seconds under the condition of a temperature of 40° C. from the height of 900 mm was measured after one minute as the foaming power and then measured again after 5 minutes further as the foam stabilized. The samples were respectively measured three times, to find an average of the heights of foams measured and the average value was indicated as a relative value when the value of the commercially available comparative product was defined as 1.00.

TABLE 4

| | Average particle diameter (μm) | Foaming power | Stability of foams |
|---|---|---|---|
| Granular anionic surfactant of example 6 | 1056 | 1.25 | 1.04 |
| Comparative product: SULFOPON 1216G*[1] | 1060 | 1.00 | 1.00 |

*[1]Manufactured by COGNIS

Test Example 5

A cement composition having the following percentage composition by using a commercially available cement product, Instant Cement (manufactured by Housmender Co., LTD) was used to confirm the effect of the granular anionic surfactant obtained in Example 6 as an air-entraining agent. Also, for comparison, a cement composition was prepared using the commercially available product shown in Table 5 in the same manner as above. With regard to these cement compositions, the amount of air was measured by the following method. The results are shown in Table 5.

| <Cement composition> | |
|---|---|
| Instant Cement | 100 parts by weight |
| Ion exchange water | 32 parts by weight |
| Air-entraining agent | Amount shown in Table 5 |

Amount of Air

Ion exchange water, portland cement, sand and an air-entraining agent were evenly mixed using mortar cone for 30 seconds at 20° C. to measure the bulk density of this mixture by using a container whose bulk density was known, to thereby calculate the amount of air according to the following equation.

Amount of air [%]=((Bulk density before the air-entraining agent is added)−(Bulk density after the air-entraining agent is added))/(Bulk density before the air-entraining agent is added)×100

TABLE 5

| Air-entraining agent | Compounding amount (parts by weight) | Amoun of air (%) |
|---|---|---|
| None | 0 | 0 |
| Granular anionic activator of example 6 | 0.02 | 19.7 |
| Comparative product: AOS*[1] | 0.05 | 7.5 |

*[1]Manufactured by Clariant Co., Ltd.

The invention claimed is:

1. A process for producing a granular anionic surfactant, said method comprising:
   granulating an anionic surfactant paste and a powder raw material for a time sufficient to both form said granular anionic surfactant while simultaneously drying said granular anionic surfactant, while adding an anionic surfactant paste to a powder raw material under reduced pressure, in a granulator, wherein the granulator is provided with a stirring blade and a cracking blade, and wherein the pressure in the granulator is 0.67 to 40 kPa, said granular anionic surfactant product comprising 80 to 99.5% by weight of anionic surfactant, wherein the granules during the drying and granulating step have a temperature ranging from 35 to 75° C. with a variation of ±5° C., and wherein the granular anionic surfactant product has a water content of 0.3 to 2.5% by weight.

2. The process according to claim 1, wherein the powder raw material comprises at least one or more selected from the group consisting of a surfactant, a water-soluble inorganic salt and a water-insoluble inorganic salt.

3. The process according to claim 1, wherein a part of the resultant granules are used as the powder raw material.

* * * * *